CROSSBAR SWITCH STATION CONCENTRATOR

Filed Aug. 30, 1960

3 Sheets-Sheet 1

INVENTOR
R. A. PLYER
BY
S. E. Hollander
ATTORNEY

CROSSBAR SWITCH STATION CONCENTRATOR

Filed Aug. 30, 1960 3 Sheets-Sheet 2

INVENTOR
R. A. PLYER
BY
S. E. Hollander
ATTORNEY

Dec. 24, 1963 R. A. PLYER 3,115,551

CROSSBAR SWITCH STATION CONCENTRATOR

Filed Aug. 30, 1960

3 Sheets-Sheet 3

INVENTOR
R. A. PLYER
BY
S. E. Hollander
ATTORNEY 3,115,551
CROSSBAR SWITCH STATION CONCENTRATOR
Roger A. Plyer, San Rafael, Calif., assignor to American Telephone and Telegraph Company, New York, N.Y., a corporation of New York
Filed Aug. 30, 1960, Ser. No. 52,936
14 Claims. (Cl. 179—18)

This invention relates to telephone house intercommunicating systems and, more particularly, to a concentrator for use with such systems to minimize the connecting wiring required therefor.

In the telephone switching art, the use of house intercommunicating or key telephone systems has enjoyed a significant resurgence of interest. One of the salient factors contributing to the widespread demand for key telephone systems is the efficiency with which users who have a very high community of interest can intercommunicate.

In the usual key telephone system, a user may, by depressing a single key extend a connection to one or more individuals with whom he has a close working relationship.

Manifestly, a cardinal advantage which inheres in the key system is the immediacy and directness of the connection between the users of the system. Examined in perspective, the advantages enjoyed derive from the fact that the necessity for routing through remote automatic telephone central office or private branch exchange equipment is obviated.

Unfortunately, this singular advantage and core of efficiency of the key telephone system (i.e., direct connections between each of the telephone stations) is precisely the same area in which a number of obvious hindrances have taken root. Thus, in a key telephone set (referred to commercially as a "Call Director") having, for example, sixteen key positions, as many as 48 conductors must be extended to the key telephone sets in order to provide direct interconnections among the substations. The economic burden which this requirement imposes is a significant one and, moreover, the necessity for provision of conduits of adequate size to accommodate the large number of cable pairs presents structural difficulties in the placement or concealment of such conduits in walls or under floors, etc.

The most direct and obvious solution to this problem would be to emulate the manner in which telephone central offices and private branch exchanges (PBX's) evolved. As is well known, the latter automatic switching systems found their genesis in the necessity to avoid the overwhelming burden of connecting each subscriber directly to every other subscriber. But to follow this procedure would be defeative of the controlling purpose and function of house intercommunicating systems, which is to provide ready and immediate direct access from a calling party to a called party. To convert house intercommunicating systems into miniature central offices of PBX's would be to impose the same signaling burden on a house system user as is inexorably required by a central office telephone user or PBX user.

As a concrete illustration, a user of house or key telephone equipment would then be required to dial or otherwise specifically signal sufficient intelligence (relating to the called party) to a central communication facility, analogous to a central office, which would then complete the call in a manner in accordance with standard telephone office practice. In this manner, the advantages of immediacy of connection through the simple depression of a key and without further signaling are substantially vitiated, if not completely lost.

Manifestly, a real need exists in house intercommunicating or telephone key systems for an arrangement in which a call may be extended from one party to a number of others (e.g., from executive to staff employees, hospital superintendent to nurses, etc.) without the necessity of extending the cumbersome full complement of cable pairs among the users, or lines, to be interconnected.

It is, therefore, an object of this invention to provide a key telephone switching system in which no dialing is required.

It is a further object of this invention to provide a key telephone system in which the number of conductors extended to each substation or outgoing line is substantially reduced.

An additional object of this invention is to provide a key telephone system incorporating concentrator facilities.

Still another object of this invention is to provide a key telephone system using common control equipment of relatively simple construction.

A further object of this invention is to provide a key telephone system in which the calling line is connected to the common control equipment through the depression of a pick-up key.

A further object of this invention is a key telephone system in which a called line is automatically identified by interrogating the calling telephone set.

These and other objects of the invention are achieved in one illustrative embodiment in which a crossbar switch station concentrator is used with multibutton key telephone sets ("Call Directors") to reduce the number of wires required to connect the multibutton set to its associated equipment.

In lieu of extending three conductors for each connectable line to the multibutton telephone set, only a single conductor for each of the lines (or stations) connectable to the set plus an additional five lines per set is extended to common equipment.

As a concrete illustration, if sixteen line circuits are available to the multibutton telephone set, 48 conductors were required heretofore. In accordance with the present invention, a single conductor per line or sixteen conductors plus five common conductors (or a total of twenty-one) are utilized.

This advance is accomplished in part by removing the connecting functions and switching capabilities from the telephone set and transferring it to common equipment, referred to herein as a station concentrator or line connector. A crossbar switch arrangement is utilized to perform the connecting function in the concentrator. In order to control the crossbar switch, three common relays and an additional relay per multibutton telephone set are utilized. In practice, each multibutton telephone set is assigned to a vertical on a crossbar switch and the lines to which the sets are connectable are assigned to horizontal levels on the same switch. Two horizontal levels, however, are reserved as steering levels and the remaining eight horizontal levels are available for sixteen line circuits, as will be explained herein.

In operation, when station 1 goes off-hook and the user at station 1 depresses a key representing line 2, a circuit is extended over a position indicating conductor to the station concentrator equipment. The latter, in turn, energizes another conductor toward the calling multibutton telephone set in the form of a ground condition. This ground condition is extended through the operated key at the calling set and back again to the common equipment to operate specific horizontal or select magnets associated with called line 2. In addition, a hold magnet is operated for the vertical path representing station 1 or the calling telephone set. A path is thereby extended from the calling multibutton set or "Call Director" through the concentrator to the called line. Thereupon, the common equipment is released and may be reoperated to serve additional calling sets.

A feature of this invention is a station concentrating circuit which reduces the number of lines necessary in house intercommunicating systems.

Another feature of this invention is a crossbar switch arrangement for interconnection of a plurality of key sets to a plurality of called lines.

Still another feature of this invention is an arrangement for providing common control facilities for a key set intercommunicating system.

Another feature of this invention is an arrangement for providing for the operation of a plurality of horizontal magnets simultaneously in a cross bar switch.

Another feature of this invention includes facilities for insuring equitable access to the common control equipment.

These and other objects and features of the invention may be more readily apprehended from an examination of the following specification and attached drawing in which.

*General Description*

Figures 1, 4, 5:
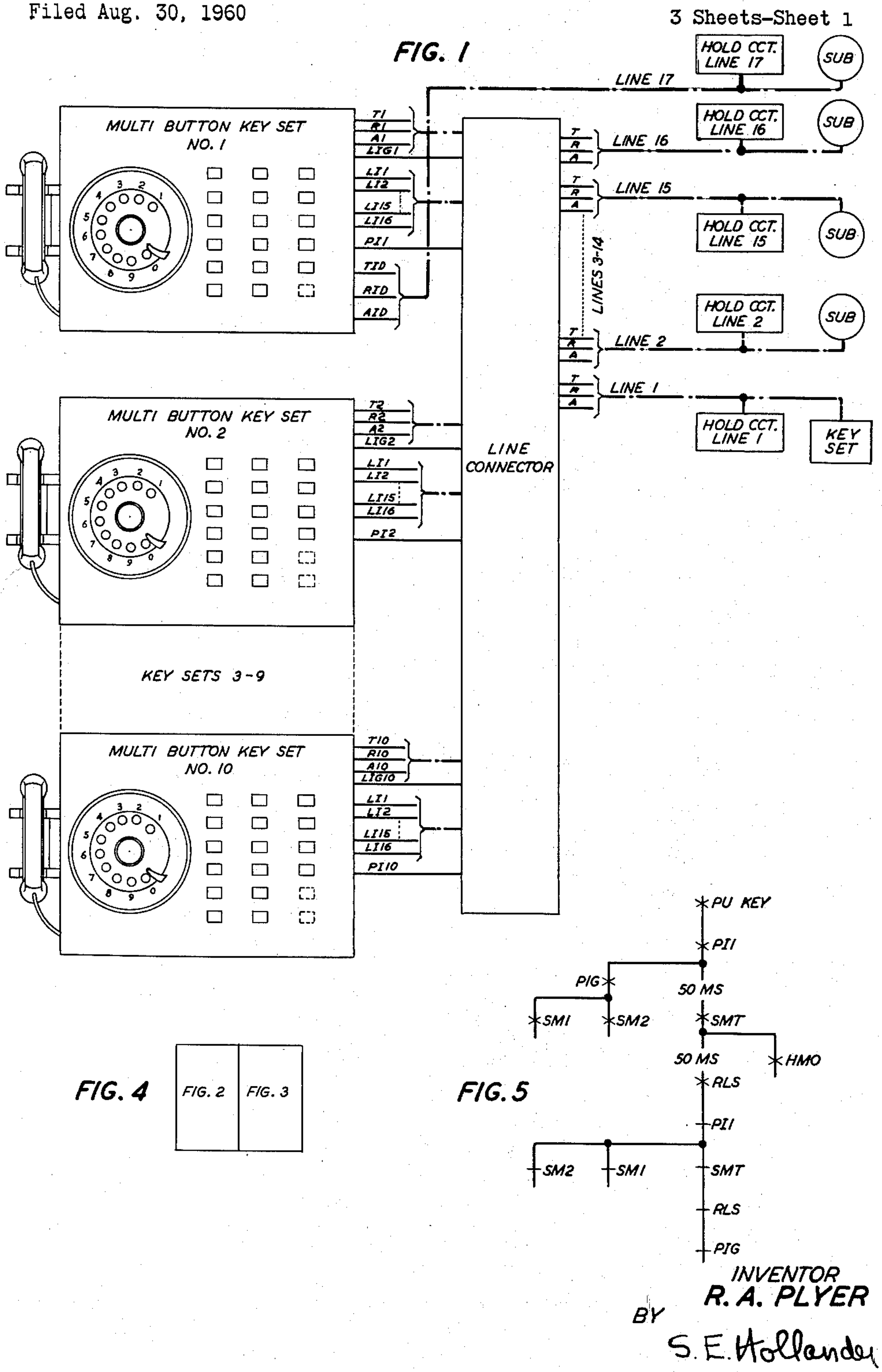
FIG. 1 shows a block diagram of a specific illustrative embodiment of the invention.
FIG. 4 shows the manner in which FIGS. 2 and 3 may be disposed to disclose the invention.
FIG. 5 is a sequence chart showing the time sequence of operation of the relays of FIGS. 2 and 3.
Figure 2:
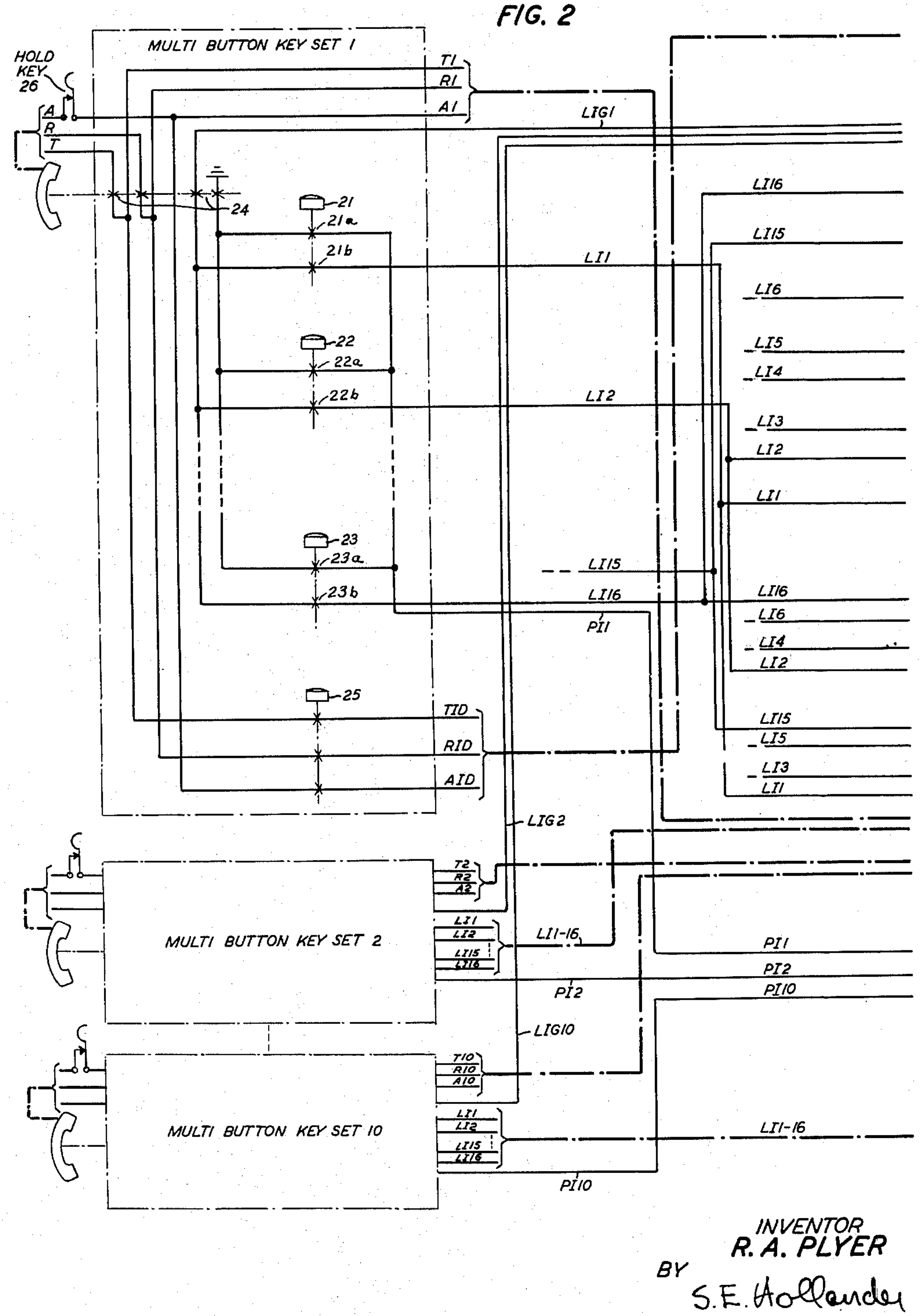
FIGS. 2 and 3 illustrate in further detail illustrative embodiments shown in FIG. 1.
Figure 3:
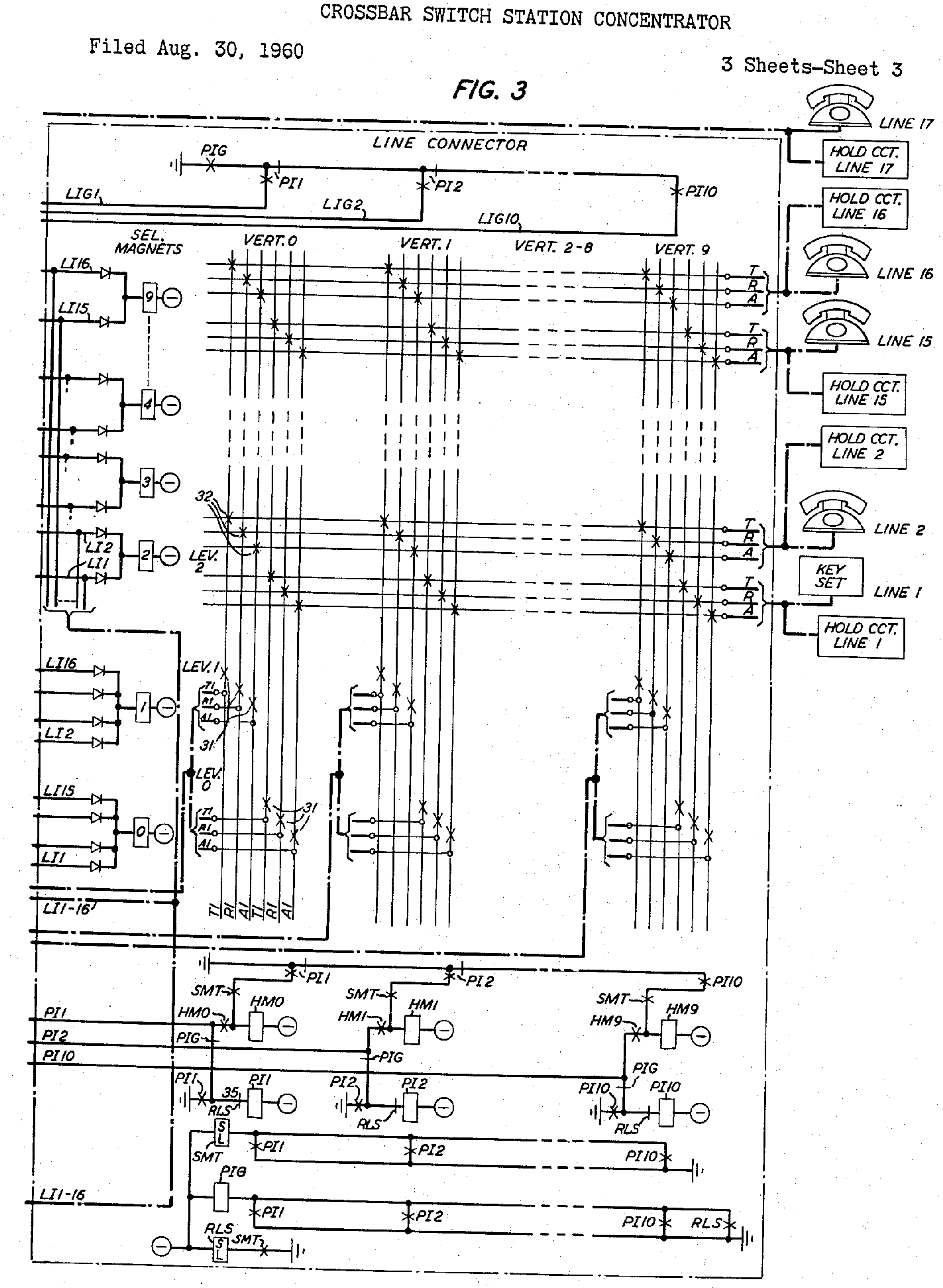

Referring now to FIG. 1 it is seen that a plurality of "Call Directors" or multibutton key telephone sets 1–10 are shown. Although only three "Call Directors" are shown as inputs to the line connector it is understood that a full complement would include ten key telephone sets. The line connector shown in outline form and in further detail in FIGS. 2 and 3 is arranged to extend calls from the "Call Directors" to a plurality of lines which illustratively are sixteen in number although only four are shown. These lines may be extended to ordinary substations or other multibutton key telephone sets. It will be noted that connections are extended from each "Call Director" over conductors to the line connector.

Each key set, for example key set 1, has a line indicating ground conductor LIG1, a position indicating conductor PI1, tip and ring conductors for voice transmission T1, R1 and a hold conductor A1. Moreover, each "Call Director" has a plurality of lines LI1–LI16 extending to the line connector which are equal in number to the available lines which may be reached by the "Call Director." The function of the line connector as is apparent from FIG. 1 is to provide facilities for connecting a plurality of "Call Directors" to a number of lines. If the line connector were not used, each "Call Director" would require a tip, ring and hold connector connected to the "Call Director" for each line available to it.

In general use, to make an outgoing call a station user goes off-hook and depresses a pickup key 22 at key set 1 associated with the telephone set or line 2 to which the user wishes to be connected. Operation of the pickup key 22 identifies the telephone set or "Call Director" requesting service to the line connector over lead PI1. The line connector circuit is activated and initiates operations to connect the calling telephone set to the desired line circuit, for example line 2, corresponding to the pickup key operated.

The line connector grounds lead LIG1 to the calling telephone set or "Call Director" 1 to determine the identity of the called line. This information is delivered back to the line connector over one of the sixteen line circuits LI1–LI16 in accordance with the particular pickup key operated. Since pickup key 22 is associated with line 2, lead LI2 is energized. When the line connector receives this information it functions to connect the key set 1 to the line 2 as explained herein. Having done so the line connector releases and may be utilized to serve another call. The connection is held by the calling telephone set off-hook condition. It will be particularly noted that the entire circuit operation is performed in response to a depression of a single key designating the line to be called thus preserving intact the advantages of previous key sets adverted to above.

It will also be observed that line 17 is directly connectable to key set 1 in by-pass of the line connector. This feature permits full exploitation of the key set where the number of keys exceeds the capacity of the line connector as explained further herein.

*Major Components*

Referring now to FIGS. 2 and 3, detached contact circuit schematics of the equipment shown in block form in FIG. 1 are indicated. In FIG. 2 a detailed rendition of the circuitry of a particular key set is shown as illustrative. The remaining key sets, although not shown in detail, are assumed to be similar in format to multibutton key set 1. In FIG. 3 a partial schematic drawing of a crossbar switch line connector and the detached contact circuitry of the common equipment for the concentrator or line connector are shown.

Relays HM0–HM9 represent ten vertical hold magnets for operation of the crossbar switch portion of the concentrator shown in FIG. 3. In a similar manner relays SM0–SM9 indicate the select or horizontal magnets for the line concentrator. For clarity, only three of the hold magnets and six of the select magnets are shown. It will be noted that relay SM0 is operated in parallel with each of the select magnets operated with odd numbered lines and relay SM1 is operated in parallel with the select magnets connected to even numbered lines. In FIG. 2 the contacts 21*a*, 21*b* of a pickup key 21 for line 1 are shown as well as the contacts 22*a*, 22*b* and 23*a*, 23*b* for pickup keys for lines 2 and 16. It will be noted that the remaining conductors are shown as described in FIG. 1.

As indicated in FIG. 3 each of the lines to which the set is connectable is assigned a horizontal level on a crossbar switch and the key sets are connected to vertical levels on the same switch.

Since switch levels 0 and 1 are utilized as steering levels as explained further herein, sixteen lines can be assigned to the remaining eight horizontal levels 2–9 when using a six-contact type switch as shown.

This results in a maximum system capacity when using a single crossbar switch of ten multibutton key telephone sets and sixteen line circuits. If more than ten "Call Directors" are to be connected in the same installation a "200-point" crossbar switch may be substituted to provide an arrangement with twenty vertical paths and ten horizontal paths in lieu of the ten by ten switch shown. This results in an obvious increase in capacity of twenty "Call Directors" and sixteen lines. Alternatively, in the event that a greater number than sixteen lines are required, a second ten by ten switch may be added to increase the system capacity to ten "Call Directors" and 36 lines. In the latter instance the vertical levels on the second switch would be connected to the vertical levels on the first switch to provide a capacity of sixteen lines on the first switch as described above and twenty on the second yielding a total of 36.

*Description of Operation*

When a user at key set 1 removes the receiver and depresses a pickup key 22 associated with line 2, for example, conductor PI1 is grounded over a path including ground, switchhook contacts 24, contacts 22*a* of pickup key 22, conductor PI1 (to the line connector), contacts of relay PIG, contacts of relay RLS, winding of relay PI1 to negative battery.

It will be convenient in facilitating comprehension of the sequence of operations of the instant invention to refer periodically to FIG. 5 in which a time sequence chart of the relay operation is shown.

Operation of relay PI1 results in the operation of relay PIG over an obvious circuit. Relay PIG in turn grounds conductor LIG1 toward key set 1 over the contacts of relay PIG and relay PI1, conductor LIG1, switchhook contacts 24, contacts 22*b* of the pickup key 22 for line 2, conductor LI2 to the windings of magnets SM1 and SM2.

It will be noted that on the operation of relay PI1, relay SMT was also operated. Slow operating relay SMT permits the select magnets to operate and their fingers to come to rest before the vertical magnet (hold magnet) can be operated. Thus in view of the contacts of relay SMT in series with hold magnet HM0, hold magnet HM0 is not operated until relay SMT operates. At this time, relay HM0 operates over a path including ground, contacts of relay PI1, contacts of relay SMT, winding of relay HM0 to negative battery.

Hold magnet HM0 locks to ground over its own contacts and lead PI1 over the circuit traced above. A path is now completed through the crossbar switch of FIG. 3 over a circuit including conductorse T1, R1 and A1 of vertical 0, contacts 31 at horizontal level 1 which were operated by the closure of select magnet SM1, contacts 32 of level 2 which were operated by select magnet SM2, in multiple through verticals 1–9 to line 2.

Relay SMT results in the operation of relay RLS to initiate the release cycle. Relay RLS, also a slow-to-operate relay, upon operation, opens contacts 35 in series with relay PI1 to interrupt the holding path for that relay. Release of relay PI1 in turn produces the release of relays (select magnets) SM1 and SM2 at the normally open contacts of relay PI1 in series with conductor LIG1. Similarly, relay SMT is relased at the contacts of relay PI1 in series therewith.

Relay PIG, however, is held operated by the contacts of relay RLS even though the contacts of relay PI1 open.

When relay SMT releases, relay RLS also releases and in turn finally releases relay PIG.

A direct path now exists to the called substation and ringing is performed conventionally by means not shown. The connection is released at the switchhook contacts of the calling party upon disconnect by the removal of ground from lead PI1 to release hold magnet HM0.

The common control circuit has now been released and is ready to serve another call. It will be noted that relay PIG insures that in the event of a simultaneous seizure of the line connector, and simultaneous operation of a number of relays PI–, "Call Director" telephone sets which have their corresponding relay PI– operated will be served before another telephone set is admitted to the common control equipment. For example, if relays PI1 and PI10 operate simultaneously, relay PI2 will be blocked at the contacts of relay PIG in series with relay PI2 until key sets 1 and 10 are served. This feature prevents inequitable exploitation of the circuit by a first choice telephone set.

It will also be noted that it is possible to extend a connection from "Call Director" 1 of FIG. 2 to a line not connected to the concentrator, for example line 17, over a direct connection as indicated by the contacts of pickup key 25 which is directly connected to line 17.

Conventional "hold" features are available for both the concentrated and direct-connected paths by use of hold key 26, the contacts of which are normally closed. In previous arrangements relay equipment was connected to "hold" conductor A such as shown in outline form at "Hold CCT Line 17" connected to conductor AID, line 17. This equipment serves the usual function of bridging the line to be held while another connection was made.

In the present arrangement similar relay equipment is connected to lines LI1–LI16 as shown in outline form at "Hold CCT Line 1," etc.

A holding operation is as follows: Assume a user at key set 1 is connected to line 2 and wishes to hold that line and establish a connection to line 16. Depressing the hold key 26 opens lead A1 which is extended through crosspoints of crossbar switch at horizontals 1 and 2 and vertical 0. Subsequent operation of key 23 initiates a connection through the line connector to line 16 in the manner explained above. Through well-known mechanical interlocking arrangements the depression of key 26 automatically releases key 22. Moreover, opening of lead A1 operates equipment in "Hold CCT Line 2" to provide a holding bridge across line 2. The connection which has been extended to line 16 is maintained in the manner described above. When the user elects to return to line 2, key 22 is again depressed which, through mechanical inerlocking facilities, releases key 23.

Release of key 23 removes the holding ground from contacts 23*a* on conductor PI1 permitting relay HM0 to release. Since the contacts of key 22 are now closed, a circuit is extended over conductor PI1 to operate relay PI1 and thereby initiate the connection of a call through the line connector from key set 1 to line 2 in the manner explained above. When this connection is effected the holding bridge across line 2 is automatically removed by standard equipment (not shown) in the holding circuit and a direct path again extends to line 2.

For clarity of presentation the details of the holding circuit equipment have not been shown. For a detailed explanation of suitable holding apparatus, reference may be made to Patent No. 2,862,062 of H. T. Carter of November 25, 1958 and to an article entitled "The 1A1 Key Telephone System" by L. H. Allen appearing in "Bell Laboratories Record," April 1956 at page 140.

It will be noted from the illustration of typical operating procedure described above in connecting key set 1 to line 2, that magnets SM1 and SM2 were operated. It is understood that the operation of differing combinations of select magnets is necessary to effect connections to each of the called lines. For facility of reference these combinations are described as follows:

| Line: | Select magnets |
|---|---|
| 1 | SM0, SM2 |
| 2 | SM1, SM2 |
| 3 | SM0, SM3 |
| 4 | SM1, SM3 |
| 5 | SM0, SM4 |
| 6 | SM1, SM4 |
| 7 | SM0, SM5 |
| 8 | SM1, SM5 |
| 9 | SM0, SM6 |
| 10 | SM1, SM6 |
| 11 | SM0, SM7 |
| 12 | SM1, SM7 |
| 13 | SM0, SM8 |
| 14 | SM1, SM8 |
| 15 | SM0, SM9 |
| 16 | SM1, SM9 |

From what has been discussed above it is apparent that the direct connection technique as shown for line 17 may be utilized to exploit full key set capacity where it exceeds the capacity of the connector. Those buttons on the key sets in FIG. 1 which are not so utilized are shown in dotted outline.

It is understood that the above embodiments are merely exemplary and that various modifications may be made without departing from the spirit and the scope of the invention.

What is claimed is:

1. An automatic telephone switching system for use with key telephone systems comprising concentrator switching means, a plurality of telephone substations, a plurality of individual lines, said substations including a plurality of keys each representative of said individual lines, signaling means connecting said substations to said concentrator means including a plurality of signaling leads individually coupling said keys to said concentrator, a speech communication path from each of said substations to said concentrator, means connecting each of said individual lines to said concentrator, and means in said concentrator including said signaling means operative in response to the actuation of a selected key at a calling one of said substations to energize said signaling lead connected to said selected key and to extend a connection from said calling substation over said communication path to said line represented by said selected key.

2. A station concentrator for use with key telephone systems comprising a plurality of called lines, a plurality of telephone substations having key fields in which said keys are representative of said individual called lines, a plurality of signaling leads individually connected to said keys, a crossbar switch having a plurality of vertical and horizontal conductive paths, means connecting said substations to said vertical paths, means connecting said lines to said horizontal paths, contact sets disposed at the intersection of said paths, means operative in response to the actuation of a key in one of said key fields at a calling substation for controlling said crossbar switch over a path including said signaling lead connected to said actuated key to actuate the contact set at the intersection of the conductive paths to which said calling substation and said called line are connected.

3. An automatic telephone switching system comprising a crossbar switch having a plurality of vertical and horizontal conductive paths, contact sets disposed at the intersections of said paths, a plurality of called lines, a plurality of telephone substations including key fields in which said keys are representative of individual ones of said called lines, means connecting said substances to said vertical paths, means connecting said individual called lines to said horizontal paths, a plurality of select magnets and a plurality of hold magnets in said crossbar switch for controlling said horizontal and vertical paths respectively, means responsive to the actuation of a key at a calling one of said substations indicative of a particular called line for energizing a selected two of said select magnets corresponding to said particular line and for actuating said hold magnet corresponding to said calling substation, and additional means in said switch operative in response to the joint operation of said select and hold magnets for actuating the contact set at the intersection of said vertical and horizontal conductive paths to which said calling substation and a line represented by said actuated key are connected.

4. A station concentrator for use with key telephone systems comprising a plurality of called lines, a plurality of telephone substations having key fields in which said keys are representative of individual ones of said called lines, a plurality of signaling leads individual to said keys, a crossbar switch having a plurality of horizontal and vertical bars, horizontal and vertical conductive paths respectively controlled by said bars, a plurality of vertical magnets individual to said vertical bars, a plurality of horizontal magnets individual to said horizontal bars, contact sets disposed at the intersection of said bars, means for connecting said substations to said vertical paths and said called lines to said horizontal paths, means operative in response to the actuation of one of said keys at a calling one of said substations for actuating a plurality of select magnets over said signaling lead connected to said actuated key, timing means, and means responsive to the actuation of said select magnets and the operation of said timing means for energizing one of said vertical magnets to actuate selected contact sets at the intersection of said actuated bars.

5. An automatic telephone switching system comprising a crossbar switch having a plurality of vertical and horizontal conductive paths, contact sets disposed at the intersections of said paths, a plurality of called lines, a plurality of telephone substations including key fields in which said keys are representative of individual ones of said called lines, means connecting said substations to said vertical paths, means connecting said individual lines to said horizontal paths, relay control means for operating said crossbar switch, means operative in response to the actuation of a key at a calling one of said substations for energizng said relay control means to actuate said crossbar switch to extend a connection through the contact set at the intersection of said paths represented by said calling substation and a called line represented by said key, and additional relay means responsive to the simultaneous actuation of a plurality of keys at different calling substations for controlling said crossbar switch to process said simultaneous calls before any other subsequent calling substation is served.

6. An automatic telephone switching system comprising a concentrator, a plurality of telephone substations, a plurality of called lines, said substations including key fields in which said keys are individually representative of called lines, means connecting said substations to said concentrator, means connecting a first group of said individual lines to said concentrator, means connecting said substations to a second group of said indivdual lines, means operative in response to the actuation of a key at a calling one of said substations representing a particular line in said first group for actuating said concentrator to extend a path from said substation to said particular line, and additional means operative in response to the actuation of a key at one of said substations representing a particular line in said second group of lines for directly extending a connection to said particular line.

7. An automatic telephone switching system comprising a crossbar switch having a plurality of vertical conductive paths and a plurality of groups of horizontal conductive paths, contact sets disposed at the intersections of said paths, a plurality of called lines, plurality of telephone substations including key fields in which said keys are individually representative of said called lines, means connecting said substations to said vertical paths, means connecting said individual lines to a first group of said horizontal paths, a second group in said groups of horizontal paths being adapted to control the routing of connections through said first group of horizontal paths, a plurality of select magnets associated with said horizontal paths and a plurality of vertical magnets associated with said vertical paths, means responsive to the actuation of a key at a calling one of said substations for energizing a select magnet associated with a horizontal path in said first group and a select magnet associated with a horizontal path in said second group, means responsive to the energization of said select magnets for actuating a vertical magnet associated with the vertical path connected to said calling substation, and additional means responsive to the joint operation of said select and vertical magnets for actuating the contact set at the intersection of said paths to which said calling substation and the line represented by said actuated key are connected.

8. An automatic telephone switching system comprising a crossbar switch having a plurality of vertical and horizontal conductive paths, a plurality of contacts arranged in sets at the intersections of said paths, a plurality of individual lines, a first group of said horizontal conductive paths being individually connected to said lines, a second group of said horizontal paths being arranged to control connections through said first group, a plurality of substations, said vertical paths being individually connected to said substations, a plurality of select magnets for actuating said horizontal paths, a plurality of vertical magnets for actuating said vertical paths, said contact sets being arranged in a first group of contacts and a second group of contacts, half of said paths in said first group of horizontal paths being connected through said first group of contacts, the remainder of said paths in said first group of horizontal paths being connected through said second group of contacts, said substations including a plurality of keys individually representative of said lines, means responsive to the actuation of a key at a calling one of said substations for energizing a select magnet associated with said first group of horizontal paths and a select magnet associated with said second group of horizontal paths, means responsive to the operation of said select magnets for energizing a selected set of contacts in said second group of horizontal paths and for actuating a vertical magnet associated with said calling substation to extend a path from said calling substation to a line represented by said actuated key over one of said two groups of contacts in said selected set.

9. An automatic telephone switching system comprising a concentrator, a plurality of telephone substations, a plurality of individual lines, said substations including key fields in which said keys are representative of said individual lines, means connecting said substations to said concentrator, means connecting said individual lines to said concentrator and means in said concentrator operative in response to the actuation of a selected key at a calling one of said substations to extend a signaling path from said concentrator to said substation key field to identify said line represented by said selected key.

10. An automatic telephone switching system comprising a crossbar switch having a plurality of vertical and horizontal conductive paths, contact sets disposed at the intersections of said paths, a plurality of called lines, a plurality of telephone substations including key fields in which said keys are representative of individual ones of said called lines, means connecting said substations to said vertical paths, means connecting said individual lines to said horizontal paths, relay control means for operating said crossbar switch, means operative in response to the actuation of a key at a calling one of said substations for energizing said relay control means to extend a connection from said relay control means to said calling substation key field over a first path and for extending a connection from said calling substation key field to said relay control means over a second path to identify the called line represented by said actuated key.

11. An automatic telephone switching system in accordance with claim 10 comprising additional relay means for actuating said crossbar switch to effect a connection through the contact set at the intersection of said paths represented by said calling substation and said called line.

12. An automatic telephone switching system in accordance with claim 11 including means responsive to the simultaneous actuation of a plurality of keys at different calling substations for controlling said crossbar switch to extend connections to said lines represented by said simultaneously actuated keys prior to serving any other subsequent calling substation.

13. An automatic telephone switching system comprising a concentrator, a plurality of telephone substations, a plurality of called lines, said substations including key fields in which said keys are representative of individual ones of said called lines, means connecting said substations to said concentrator, means connecting said individual lines to said concentrator, means at said concentrator operative in response to the actuation of a first key at one of said substations representing a first called line for actuating said concentrator to extend a path from said substation to said first line, a hold key at said substations, holding means connected to said first called line for maintaining said line energized under control of said hold key, means in said concentrator responsive to the actuation of said hold key and a second key at said calling substation for disconnecting said path from said calling substation to said first called line and for establishing a connection from said calling substation to a second called line, and means in said concentrator responsive to said holding means and the reoperation of said first key for reextending a connection from said calling substation to said called line and for disconnecting said connection to said second called line.

14. An automatic telephone switching system comprising a crossbar switch concentrator having a plurality of vertical conductive paths and a plurality of groups of horizontal conductive paths, contact sets disposed at the intersection of said paths, a plurality of called lines, a plurality of telephone substations including key fields in which said keys are individually representative of said called lines, means connecting said substations to said vertical paths for speech communication, means connecting said individual lines to a first group of said horizontal paths, a second group in said groups of horizontal paths being adapted to control the routing of connections through said first group of horizontal paths, a plurality of select magnets associated with said horizontal paths and a plurality of vertical magnets associated with said vertical paths, relay means in said concentrator responsive to the actuation of a key at a calling one of said substations for extending a signaling connection to said key field in said calling substation to identify the called line represented by said actuated key, additional means responsive to the operation of said relay means for energizing a select magnet associated with a horizontal path in said first group and a select magnet associated with a horizontal path in said second group, means responsive to the energization of said select magnets for actuating a vertical magnet associated with the vertical path connected to said called substation, and means responsive to the joint operation of said select and vertical magnets for actuating the contact set at the intersection of said paths to which said calling substation and the line represented by said actuated key are connected.

References Cited in the file of this patent

UNITED STATES PATENTS

| | | |
|---|---|---|
| Re. 22,442 | Lomax | Feb. 22, 1944 |
| 1,633,116 | Lomax | June 21, 1927 |
| 1,635,805 | Wicks | July 12, 1927 |
| 2,534,850 | Bowne | Dec. 19, 1950 |
| 2,883,472 | Stehlik | Apr. 21, 1959 |

FOREIGN PATENTS

| | | |
|---|---|---|
| 540,132 | Great Britain | Oct. 7, 1941 |